United States Patent [19]

Noel

[11] Patent Number: 4,576,846

[45] Date of Patent: Mar. 18, 1986

[54] FLEXIBLE PLASTIC FOAM WITH A GROOVE- AND TONGUE-LIKE CLOSING SYSTEM

[76] Inventor: Gert Noel, Hauseter Str. 123, B-4729 Hauset, Belgium

[21] Appl. No.: 647,801

[22] Filed: Sep. 6, 1984

[30] Foreign Application Priority Data

Sep. 6, 1983 [DE] Fed. Rep. of Germany ....... 3332149

[51] Int. Cl.$^4$ .......................... B32B 1/04; B32B 1/08; F16L 9/00
[52] U.S. Cl. ..................... 428/36; 138/162; 138/166; 138/DIG. 9; 428/157; 428/159; 428/188; 428/192
[58] Field of Search ............... 138/149, 162, 165, 166, 138/167, DIG. 9; 428/33, 36, 68, 121–123, 130, 156, 157–160, 167, 188, 192, 316.6

[56] References Cited

U.S. PATENT DOCUMENTS

| | | | |
|---|---|---|---|
| 3,126,035 | 3/1964 | Espetvedt | 138/162 |
| 3,204,668 | 9/1965 | Emerson, Jr. et al. | 428/316.6 |
| 4,087,501 | 5/1978 | Moser | 428/36 |
| 4,287,245 | 9/1981 | Kikuchi | 428/36 |

FOREIGN PATENT DOCUMENTS

| | | | |
|---|---|---|---|
| 154236 | 3/1982 | German Democratic Rep. | 138/149 |
| 150347 | 11/1980 | Japan | 428/318.4 |

Primary Examiner—William J. Van Balen
Attorney, Agent, or Firm—Larson and Taylor

[57] ABSTRACT

The present invention relates to cellular plastic insulating tubes or cellular plastic insulating plates of a flexible plastic foam with a groove- and tongue-like closing system arranged along the longitudinal axis, in which the groove and tongue can be undercut. The tongue consists of a more rigid or stiffer material than the material forming the groove, or, if the tongue consists of the same material as the insulating cellular material, this is reinforced or stiffened.

15 Claims, 21 Drawing Figures

FLEXIBLE PLASTIC FOAM WITH A GROOVE- AND TONGUE-LIKE CLOSING SYSTEM

Heating and cooling systems are currently insulated against the loss of heat or cold by the most varied types of insulating tubes or insulating plates which are designed to be drawn over the tubes or ducts. The most widely known and currently used insulating tubes or insulating plates consist of agglomerate rock wool or glass fibres, or of a wide variety of plastics, e.g. based on rubber, synthetic rubber or other plastics, or of mineral foams. Tube insulations are manufactured either as half shells or as all-round shells. Prefabricated plates of the same materials are available for insulating air ducts. The tubes are insulated by drawing the split tubes over the tube to be insulated or by applying the insulating plates laterally to the ducts to be insulated. Once the insulating tubes have been drawn over or the insulating plates applied, the open slit(s) must be closed, so as to ensure that the insulating member does not come away from the tube or duct to be insulated. A further reason for tightly closing the slit is to guarantee perfect insulation and to prevent any moisture reaching the system to be insulated through the slit in the insulating tube.

Today the method which is usually employed to close these slits lies in either winding suitable materials around the insulating layer or sticking a self-adhesive strip of a suitable material over the slit. This applies both to the slit extending in the longitudinal direction and to the joint points between the individual insulating tube sections. These slits are frequently also closed by applying a suitable adhesive to the surfaces of the joint points when the tubes are laid and then manually pressing them together, until the adhesive holds. There are also insulating tubes or plates which are provided in the factory with a self-adhesive strip, half of which is applied to the tube and the other half of which is provided with a protective foil. The person laying the tubes removes the protective layer on the one half of the adhesive strip, draws the insulating tube over the tube to be insulated and then presses the projecting foil, now free of the protective layer, onto the opposite insulating tube section so as to tightly close the slit. There are also insulating tubes which are provided with a welded-on, so-called plastic zipper. However these closing systems which are usually used today have considerable disadvantages, the following in particular:

(a) There is no guarantee that the person laying the tubes will always work in a careful manner. There are therefore frequent cases of incomplete surface adhesion of the joint points at the slit, thus leaving open areas. This kind of adhesion at the joint points of the slits by applying adhesive materials also gives rise to a hardening process, causing the formation of a cold or heat bridge, which at this point is a better conductor than the actual insulating material and thus conducts heat or cold to the outside.

(b) When adhesive foils are used to close the tube it frequently happens that the joint points of the tube slits are not firstly pressed completely together, thus causing so-called air bridges. This, in turn, results in cold or heat bridges.

(c) Laying the tubes using these closing systems is expensive, as the procedure is relatively slow.

(d) It often happens that insulating tubes or plates become covered with dust at the building site. Should the dust not be completely removed before the slit is closed, the self-adhesive foil will not adhere completely and open again after it has been laid.

(e) It is also known that insulating tubes are clamped together by plastic or metal clamps. This type of closure entails the danger of even larger air bridges forming. Satisfactory insulation cannot therefore be guaranteed.

In order to avoid these disadvantages it was proposed some years ago, in the DE-PS No. 25 03 425, to form the tube slit according to the tongue and groove principle, in which the groove and tongue could be provided with undercuts, e.g. of the dovetail type, which would then act as a snap closure. However cellular plastic insulating tubes with this kind of groove and tongue arrangement have not as yet been put into practice, probably because these groove and tongue systems cannot function as "snap closure" where cellular materials are involved. This is because in the case of hard cellular materials the undercuts are broken off upon joining while in the case of flexible cellular materials the tongue provided with undercuts is not sufficiently rigid to be inserted in the groove provided with undercuts.

The object of the present invention is therefore to provide cellular plastic insulating tubes and plates of flexible foams and with a groove and tongue closing system which can actually be put into practice and in which the groove and tongue system functions as an actual snap closure.

This object is solved in that the tongue consists of a more rigid or stiffer material than the material forming the groove, or, if the tongue consists of the same material as the insulating cellular material, this is reinforced or stiffened.

The present invention therefore relates to cellular plastic insulating tubes or cellular plastic insulating plates of a flexible plastic foam with a groove- and tongue-like closing system arranged along the longitudinal axis, in which the groove and tongue can be undercut, characterised in that the tongue consists of a more rigid or stiffer material than the material forming the groove, or, if the tongue consists of the same material as the insulating cellular material, this is reinforced or stiffened.

In order to make the tongue more rigid or stiffer than the material forming the groove, either the tongue produced from the foamed material at the same time as the groove is provided with a reinforcing coating or an inner reinforcement or the tongue consists of a more rigid or stiffer material than the cellular plastic insulating tube or the cellular plastic insulating plate.

In the latter case a plastic foam profile, for example, the density of which is, for example, 25 to 100% greater than that of the cellular plastic insulating tube or the cellular plastic insulating plate, is welded or glued to the surface opposite the groove. An embodiment of this kind is preferred according to the invention. However, instead of the plastic foam profile, it is also possible to weld or glue on a closed plastic hose or a plastic hose open in the longitudinal direction, if this is sufficiently rigid. The same applies, for example, to a closed or longitudinally open plastic, metal or glass fibre tube which, after welding or glueing on, produces the required tongue. For example, a closed or open aluminium or copper tube could be used as the tongue, if the insulating tube or the insulating plate is to have a certain degree of rigidity. Furthermore, the open or closed tubes, applied as a tongue, could, if appropriate, be used to accomodate leads, e.g. instrument leads or record lines.

The plastic foam profile described above and used as a tongue, as well as the plastic hoses and the various closed or open tubes, can also be provided with a continuous or broken or triangular notched lug which, for example, has been inserted in a slit previously made in the plastic foam in the surface opposite the groove and then glued. In the case of plastic foam profiles the lug can extend into the profile, the rigidity of which is then further increased by the lug, thus facilitating the insertion of the profile in the groove.

It is also possible to use an appropriate double profile (solid or hollow, closed or open), possibly connected by way of a common lug, in cases where, according to the invention, the insulating tube or the insulating plate comprises an additional groove instead of the tongue, so that the double profile engages on both sides in the opposite grooves in the slit surfaces.

Should it be desirable, in particular cases, for the groove and the tongue to be glued together, the adhesive can be applied to one of the groove surfaces and/or the tongue surfaces, possibly as a self-adhesive strip with a removable protective foil which, for example, can consist of paper. The adhesive can of course also be a fusion adhesive, for example in the form of an applied foil or non-woven strip which, when the insulating tubes or plates are laid, is activated by a hot air device and glued together by pressing. However magnetic lacquer can be used instead of fusion adhesive. It is of course possible to glue the tongue and/or the groove in the usual manner by means of any other conventional adhesives.

Should the groove and the tongue consist of the same material and the tongue be provided with a reinforcing coating, it is possible, during the continuous production of the insulating tubes or plates, to firstly make a groove-tongue-slit along the longitudinal axis of the insulating tube or plate in one working step, particularly if the tubes or plates consist of thermoplastic foam. This slit can be of any desired shape, angular, round, oval, etc. and is formed by means of a simple heating wire or bar. In the case of an insulating tube, the latter is then opened up, the tongue is provided with the coating, which is left to harden, and the tongue is finally inserted in the groove. When producing the groove and the tongue care should be taken to ensure that the temperature of the heating wire or bar corresponds precisely to the melting point of the extrusion material. A suitable thermostat can be used for this purpose. The temperature control must be regulated in relation to the melting point of the material and the speed of passage. Instead of using heating wires or bars, the groove and tongue can also be produced by ultrasonic systems or laser beams. Care should be taken, when producing the groove and tongue, in conjunction with the longitudinal slit, to ensure that, e.g. not too much material is melted away be overheating the heating wires or bars.

According to a further preferred embodiment of the invention, it is also possible to reinforce the tongue produced as described above by bisecting the tongue in the longitudinal direction as it is produced and letting the bisector slit project beyond the tongue into the tube shell carrying the tongue. A reinforcement strip of appropriate size and provided with adhesive on both sides or heated to welding temperature is then inserted in the bisector slit thus produced and firmly connected by pressing to the tube shell and the two tongue parts. The reinforcement strip can be smooth or, in order to increase rigidity, corrugated at right angles to the longitudinal axis, so that it can easily adapt to any bends in the tube. In the same way as the lug described above, the reinforcement strip can be provided with recesses or, for example, be formed as a corrugated punched tape. However in many cases it may be particularly advantageous to firmly insert a relatively rigid plastic strand bent in a continuously zig-zag manner or an appropriately bent metal wire in the bisector slit instead of the reinforcement strip. This ensures on the one hand that the tongue, particularly in the case of tongues undercut at the base, is of the required rigidity, so that it can be inserted in the groove, and on the other hand that the insulating tube can still be slightly bent.

However, instead of inserting a finished reinforcement strip or wire etc., it is also possible to produce in situ in the bisector slit projecting into the tube shell a reinforcement or stiffening by using a hardening plastic, which at the same time reinforces the bisector slit following firm adhesion or hardening. Suitable plastics for this purpose are known to the person skilled in the art.

According to the invention, the tube ends are preferably formed such that, particularly in the case of fairly thick tubes, they comprise an annular groove at one end and a corresponding annular tongue at the other, which annular tongue can be formed according to the tongue of the invention arranged along the longitudinal axis, both as regards shape and reinforcement or stiffening.

However, instead of the annular groove and annular tongue, one tube end can be externally milled off, e.g. up to half the thickness of the insulating tube wall, and the other end can be correspondingly internally milled off, so as to obtain an overlap plug-type connection, which can of course also be glued together in the same way as the longitudinal groove-tongue system and the annular groove-tongue system.

The invention is described further in the following with reference to the accompanying figures, although it is by no means restricted to these embodiments.

In the figures the reference numbers indicate the following:
1 flexible cellular plastic insulating tube
2, 2' Tongue
3, 3' Groove
4 Reinforcement strip
5 Fusion adhesive
6 Flexible cellular plastic insulating plate
7 Lug
8 Double profile
9 Air shaft to be insulated FIG. 1 is a cross-sectional view of a flexible cellular plastic insulating tube 1, partly open in the longitudinal direction, with the welded-on or glued-on more rigid or stiffer plastic foam tongue 2 of the invention, which engages in the groove 3.

Figure 4:
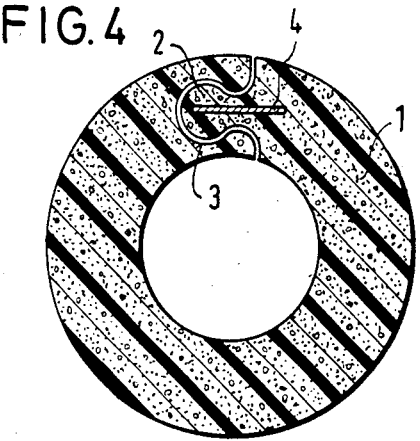
Figure 5:
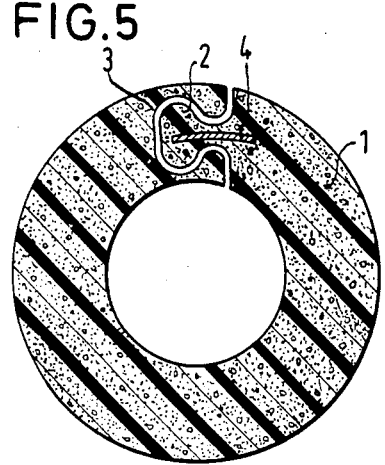
Figure 6:
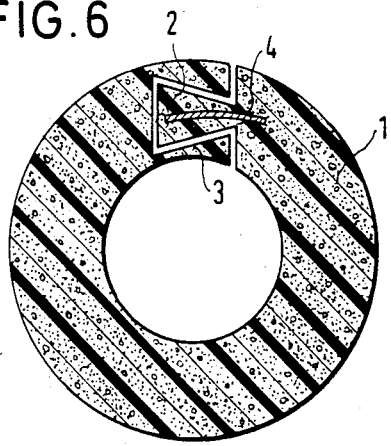

FIGS. 4–6 are cross-sectional views of a flexible cellular plastic insulating tube 1, the tongue 2, provided with the reinforcement strip 4, being in the groove 3.

Figure 7:
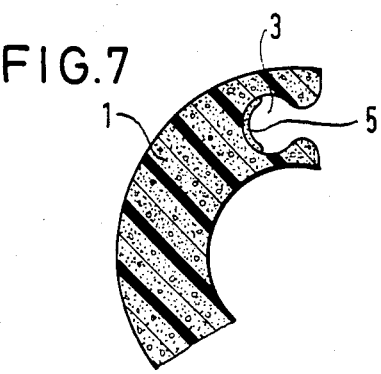
Figure 8:
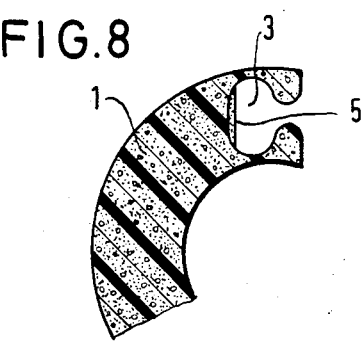
Figure 9:
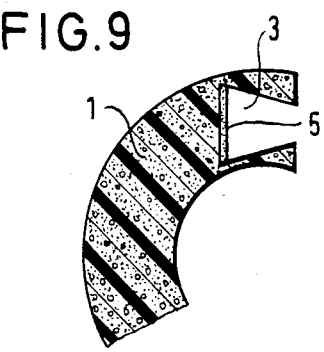
Figure 10:
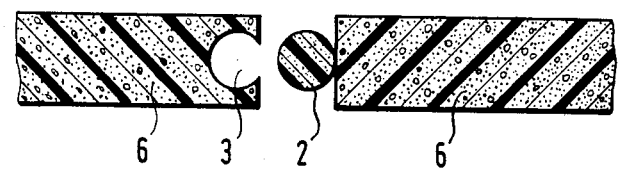
Figure 11:
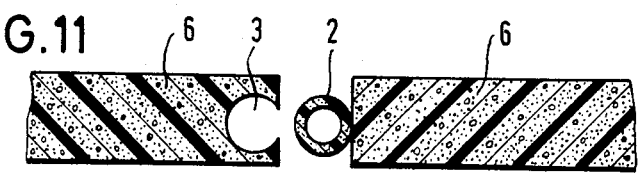
Figure 12:
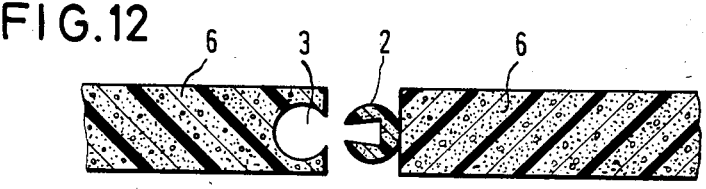
Figure 13:
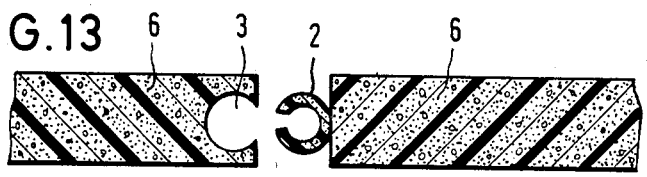

FIGS. 7–9 are cross-sectional details of flexible cellular plastic insulating tubes 1 with the grooves 3, which are partly provided with a fusion adhesive 5.

FIGS. 10–13 are cross-sectional views of two longitudinal sides of two flexible cellular plastic insulating plates 6, one of which is provided with the groove 3 and the other with the corresponding welded-on or glued-on tongue 2, which can consist of the materials mentioned in the above description.

Figure 14:
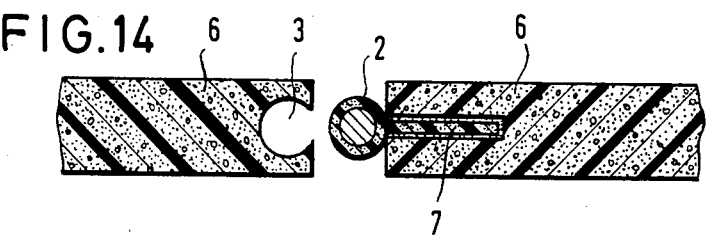

FIG. 14 is a cross-sectional view of of two longitudinal sides of two flexible cellular plastic insulating plates 6, one of which is provided with the groove 3 and the other with the tongue 2. The tongue 2 bears a lug 7, which is glued into a slit in the flexible cellular plastic insulating plate 6.

Figure 15:
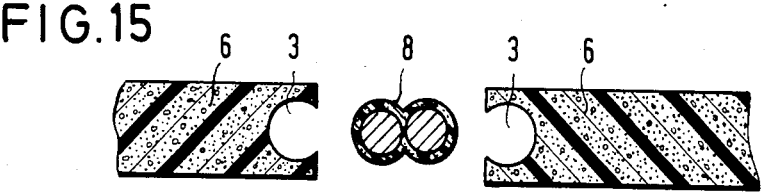

FIG. 15 is a cross-sectional view of two cellular plastic insulating plates 6, which are provided with grooves 3 and in which is inserted the double profile 8, which can be solid or hollow, closed or open, as the double tongue. These double profiles 8 can also be used for flexible cellular plastic insulating tubes 1, in which case however the centre points of the two profiles of the double profile 8 preferably lie on a circular line corresponding to the mean circumference of the respective cellular plastic insulating tube 1.

Figure 16:
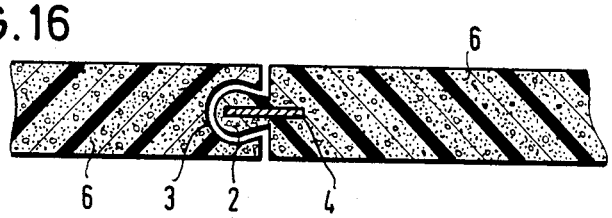

FIG. 16 is a cross sectional view of the longitudinal edges of two cellular plastic insulating plates 6 provided with a groove 3 and a tongue 2, which has been cut out of the cellular plastic insulating plate 6 and is provided for reinforcement purposes with the reinforcement strip 4, which projects from the front end of the tongue 3 into the flexible cellular plastic insulating plate 6.

Figure 17:
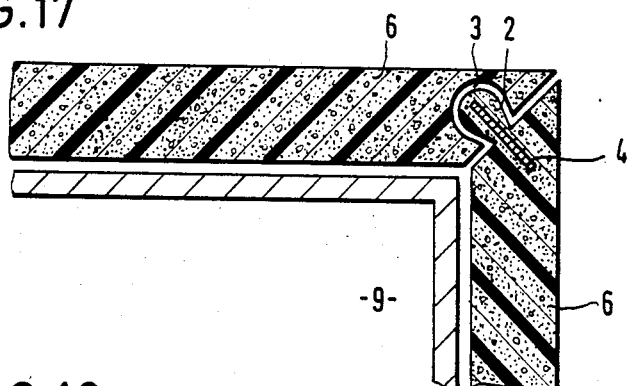

FIG. 17 is a cross-sectional detail of an air shaft 9, which is surrounded by the flexible cellular plastic insulating plates 6, the groove 3 and the tongue 2 forming a diagonal connection and the tongue 2 comprising a reinforcement strip 4, which projects into the flexible cellular plastic insulating plate 2.

Figure 18:
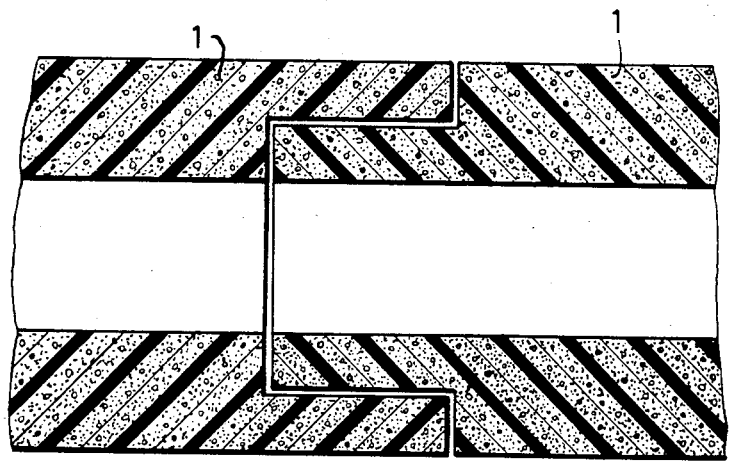

FIG. 18 is a longitudinal section of two ends, one inserted into the other and appropriately milled off, of a flexible cellular plastic insulating tube 1.

Figure 1:
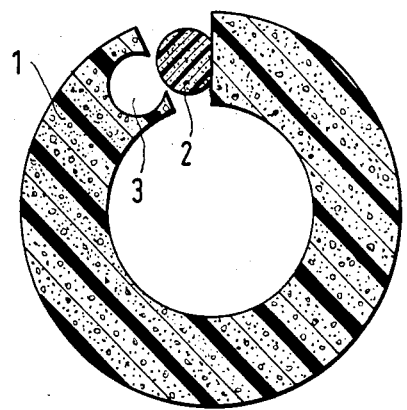
Figure 2:
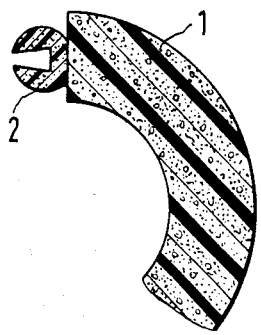
FIG. 2 is a cross-sectional view of a part of a flexible cellular plastic insulating tube 1 with the welded-on or glued-on tongue 2, open in the longitudinal direction.
Figure 3:
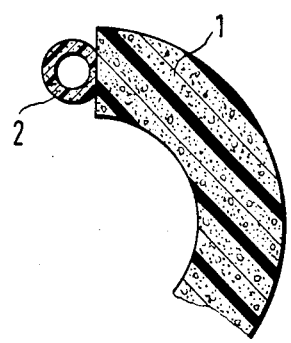
FIG. 3 is a cross-sectional view of a part of a flexible cellular plastic insulating tube 1, e.g. a polyethylene tube, with an internally hollow, welded-on or glued-on tongue 2.

The cellular plastic insulating tubes shown in FIGS. 1 to 3, for example, are smoothly cut through at the top on the production line during the continuous manufacture of the tubes, then pressed open by several centimeters at the cut point by a "holding open" device. A spherical cutter then cuts a groove, accurate to the millimeter, in one side of the tube wall. A plastic or cellular plastic profile is then continuously applied as the tongue to the opposite side of the slit by adhesion or thermal welding. The plastic or cellular plastic profile is continuously rolled off a roll and applied. Once the groove has been made and the tongue profile applied, the tube is closed again by external pressure and continues along the line. It is not absolutely essential for the groove and the tongue to be round. They can be of any desired shape, e.g. oval or angular. Polyolefines, e.g. polyethylene or polyurethane or other suitable plastics can be used.

Figure 19:
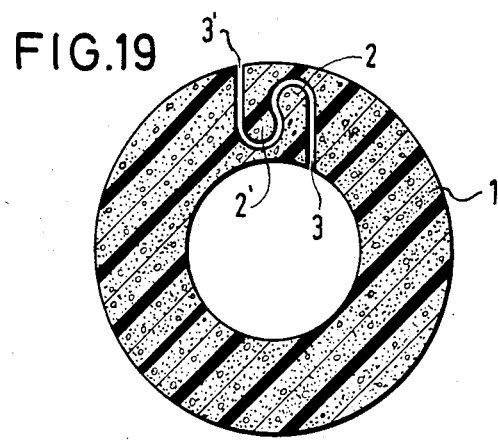
Figure 20:
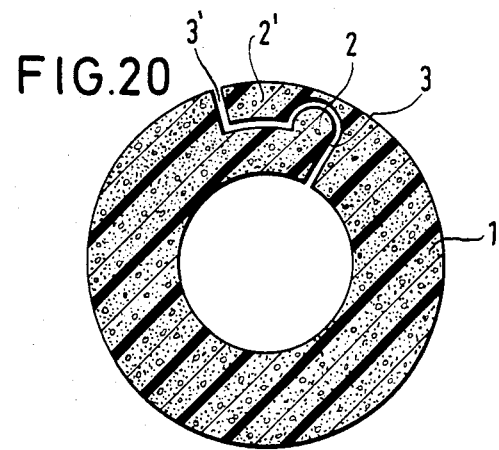
Figure 21:
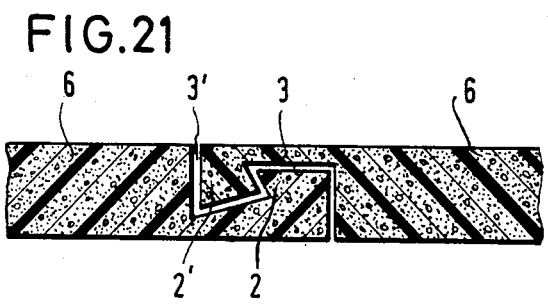

According to a further preferred embodiment of the invention, the groove and the tongue, arranged along the longitudinal axis, can also be formed as an overlap system, as shown in FIGS. 19 to 21. Other appropriate overlap shapes are of course possible in this case. The overlap systems shown in FIGS. 19 to 21 represent a quasi double groove-double tongue-system, in which the tongues in the various embodiments described above can be reinforced and provided with fusion adhesive or magnetic lacquer. However various overlap systems according to the invention can also comprise a tongue or tongues without reinforcement, as may be the case, for example, in the embodiments according to FIGS. 19 and 20, if the cellular material is not too flexible.

FIGS. 19 to 21 are cross-sectional views of the arrangement of a double tongue-double groove-overlap system.

I claim:

1. A cellular plastic insulating member of a flexible plastic foam material for thermally insulating a conduit, such as a pipe, duct or the like,
    said member having a closing line extending longitudinally along the conduit, along which line the facing longitudinal surfaces of the insulating member are joined together,
    a closing system located along said closing line and comprising a groove and a tongue, said groove comprising a longitudinally extending groove formed into the material of the member along at least one side of said line, the opening of the groove, viewed in a transverse cross section, being smaller than the dimension across certain interior portions of the groove, also viewed in transverse cross section,
    said tongue of the closing system operatively connected to the side of the closing line other than the side having the groove, the tongue having a portion, viewed in transverse cross section, which is larger than said opening of the groove, and said tongue being undercut, of smaller dimension closer to the side of the insulating member to which it is operatively connected, such that the tongue and groove snap fit into engagement with each other,
    and said tongue being stiffer than the material forming the groove.

2. A cellular plastic insulating member according to claim 1, wherein the tongue is formed of a material which is stiffer than the material which forms the groove.

3. A cellular plastic insulating member according to claim 1, wherein the tongue is formed of the same material as the material forming the groove, and wherein the tongue has a reinforcing means to render the tongue stiffer than the material forming the groove.

4. A cellular plastic insulating member according to claim 3, the tongue having the same density as the entire cellular plastic insulating member, and wherein the tongue is provided with a longitudinally extending reinforcement which projects circumferentially from the tongue across the closing line into the member on which the tongue is located.

5. A cellular plastic insulating member according to claim 3, the tongue being of the same density as the material forming the groove, and said reinforcing means comprises a covering layer covering the tongue and of a stiffer material than the material of the tongue and the material forming the groove.

6. A cellular plastic insulating member according to claim 2, said tongue being an element separate from the member and adhered to said member along its respective side of the closing line.

7. A cellular plastic insulating member according to claim 1, said tongue and groove both having a rounded cross section.

8. A cellular plastic insulating member according to claim 6, said tongue being a hollow plastic hose.

9. A cellular plastic insulating member according to claim 6, said tongue being a hollow tube opening toward the groove.

10. A cellular plastic insulating member according to claim 1, wherein opposing axial ends of said member are milled off in a radial direction, said milling off at opposite ends of the member being complementary to each other such that a first end of one member will fit in a complementary manner into a second end of a longitudinally adjacent member.

11. A cellular plastic insulating member according to claim 1, wherein one axial end of said member comprises an annular groove and the other axial end comprises an annular tongue, and wherein said annular tongue is stiffer than the material forming the annular groove.

12. A cellular plastic insulating member according to claim 1, including adhesion means for adhering the tongue and groove together.

13. A cellular plastic insulating member according to claim 12, said adhering means comprising a fusion adhesive in the form of a fusion foil, fusion non-woven material or magnetic lacquer.

14. A cellular plastic insulating member according to claim 1, wherein the member is of annular cross section for insulating a pipe, the member being a single annular member, opened and closeable along said closing line.

15. A cellular plastic insulating member according to claim 1, said member being generally flat in the vicinity of said closing system and comprising plates to be mounted on generally flat duct surfaces.

* * * * *